United States Patent [19]

Richmond et al.

[11] 4,004,075

[45] Jan. 18, 1977

[54] PACKAGING FILMS

[75] Inventors: Michael Hugh Richmond, Sarnia, Canada; Henry Glyn Wright, Signal Mountain, Tenn.

[73] Assignee: Polysar Limited, Sarnia, Canada

[22] Filed: Feb. 27, 1975

[21] Appl. No.: 553,816

Related U.S. Application Data

[63] Continuation-in-part of Ser. No. 408,680, Nov. 27, 1972.

[30] Foreign Application Priority Data

Nov. 27, 1972 Canada .............................. 157570

[52] U.S. Cl. ................... 526/342; 428/516; 428/518; 428/522; 526/348; 526/350; 526/916

[51] Int. Cl.² .............. C08F 220/44; C08F 210/00; C08F 210/08

[58] Field of Search ................. 428/522, 518, 516; 260/80.78; 526/342

[56] References Cited

UNITED STATES PATENTS

| | | | |
|---|---|---|---|
| 2,446,536 | 8/1948 | Hardy | 117/118 |
| 2,833,746 | 5/1958 | Haefner | 260/80.5 |
| 3,345,196 | 10/1967 | Goldbeck | 117/11 |
| 3,451,538 | 6/1969 | Trementozzi | 206/46 |
| 3,615,710 | 10/1971 | Lee et al. | 99/171 LP |
| 3,720,340 | 3/1973 | Lee et al. | 215/1 C |
| 3,809,569 | 5/1974 | Aronoff et al. | 117/93.31 |

OTHER PUBLICATIONS

Nakajima in "Polymer Molecular Weight Methods" – Advances in Chemistry Series 125 (American Chemical Society, Washington, D.C. 1973), pp. 98–107.

*Primary Examiner*—Donald Levy
*Assistant Examiner*—A. L. Clingman
*Attorney, Agent, or Firm*—Stevens, Davis, Miller & Mosher

[57] ABSTRACT

A process, and the product thereof, is provided for the manufacture of an interpolymer having a high resistance to chemical attack and a low gas and water vapour permeability, the interpolymer consisting essentially of an unsaturated nitrile, a monovinylidene aromatic compound and an alphaolefin. Also provided are foods, beverages and medicines contained in packages of the interpolymer.

3 Claims, No Drawings

PACKAGING FILMS

This invention relates to novel packaging materials and to the process of producing such materials. It relates more particularly to materials having improved resistance to both gas permeability and water vapour transmission, which materials can be produced by a simple polymerization process and can be readily formed into packaging materials.

A considerable amount of effort has been expended to produce packaging materials from synthetic polymers for such uses as bottles, containers, sheets and films, etc., having a high resistance to permeability of gases and a low rate of water vapour transmission. Synthetic polymers which are presently used in the preparation of such materials do not have the necessary combination of low gas permeability, low water vapour transmission, high strength properties and good processing characteristics to find wide-spread use. Efforts have been made to produce packaging materials which are based on copolymers containing a high percentage of acrylonitrile since such copolymers are known to have a high resistance to gas transmission and water vapour transmission. However, up to the present, such products have involved the incorporation of expensive comonomers and/or involve difficult production processes in order to achieve reasonable combinations of processing properties and product properties. For example, processes which have been disclosed involve the blending to two copolymers, or the graft polymerization of monomers such as styrene, acrylonitrile and methyl acrylate onto preformed polymers. Such products, produced up to the present, have not proven entirely satisfactory for use as packaging materials for foodstuffs, medicines, etc., which require protection from water vapour or gases such as oxygen. There also exists a related requirement for a packaging material having low permeability to gases, such as carbon dioxide, for use in bottles containing liquids, such as beverages, having gas under pressure dissolved therein. Such a packaging material clearly would also require good strength properties. Thus the need continues for materials which can be produced economically and readily formed into such packaging materials having the desired properties. It would also be desirable to be able to obtain such a packaging material with the appropriate properties without having a rubbery component present as is the case in some prior art materials.

It is therefore an object of this invention to provide novel packaging materials possessing improved processing and physical properties which may be used to produce packages which exhibit a high resistance to attack by chemicals and a high resistance to gas permeability, such as oxygen and carbon dioxide, and a low rate of water vapour transmission.

It is a further object of the invention to provide a novel process for the preparation of such packaging materials.

It is a still further object to provide contained foods, medicines, etc., which are protected by a novel packaging material exhibiting high resistance to carbon dioxide and oxygen permeability, a low rate of water vapour transmission and possessing improved strength characteristics.

These and other objectives are achieved by producing an interpolymer consisting essentially of 1. about 60 – 75% by weight of an unsaturated nitrile having the structure

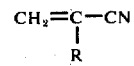

wherein R is hydrogen, an alkyl group having 1 to 4 carbon atoms or halogen, 2. about 12.5 to 20% by weight of a monovinylidene aromatic compound having the formula

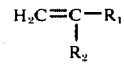

wherein $R_1$ is hydrogen, chlorine or methyl and $R_2$ is a benzene ring of a benzene ring substituted with a halogen or a lower alkyl group, and 3. about 12.5 to 20% by weight of an alpha olefin having the structure

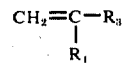

wherein $R_3$ and $R_4$ are alkyl groups having 1 to 4 carbon atoms, the amounts of (2) and (3) being within the weight ratio of 1.3:1 to 1:1.3, by a process comprising heating at a temperature of about 20° to 80° C an aqueous emulsion containing the alpha olefin to be used, one or more emulsifying agents, and a free radical polymerization catalyst, simultaneously adding to the emulsion said unsaturated nitrile and said aromatic compound at a rate such that not more than 20 to 25% of the total amount to be added has been added before about one-tenth of the alpha olefin has polymerized, and thereafter adding said unsaturated nitrile and said aromatic compound at a ratio essentially corresponding to that desired in the interpolymer and within the range of 8:1 to 3:1 and the total amount of unsaturated nitrile and aromatic compound has been added before 70 to 80% conversion has been achieved but not before 60% conversion has been achieved, and continuing the reaction to at least 85% conversion.

The interpolymers which are produced using this process are clear, tough, readily moldable materials which have a permeability to carbon dioxide of less than 15cc/100 sq. in. 24 hours . atoms. . mil. at 73° F, permeability to oxygen of less than 6.5cc/100 sq. in. 24 hours . atoms. . mil. at 73° F and water vapour transmission of less than 8.5 grams/100 sq. in. 24 hours . mil. at 95% relative humidity and preferably less than 7cc, 3cc and 4g respectively for carbon dioxide, oxygen and water vapour. The interpolymers possess good resistance to degradation on exposure to many chemicals thereby permitting their use in a broad range of applications. In accordance with the invention, the interpolymers may be oriented to produce molded or extruded articles having high strength properties which are suitable for the packaging of foodstuffs or medicines which tend to be otherwise adversely affected by water vapour and gases such as oxygen, as well as for fluids which contain gases dissolved therein, such as carbonated beverages.

The unsaturated nitriles which may be used to produce the interpolymer in accordance with the invention include acrylonitrile, methacrylonitrile, ethyl acrylonitrile, alpha-chloro-acrylonitrile, etc. The nitriles which are preferred are acrylonitrile and methyl acrylonitrile and mixtures thereof. The use, for example, of methyl acrylonitrile causes an increase in the heat distortion temperature for the interpolymer. The proportion of nitrile in the interpolymers is between about 60 and 80% by weight with 65 to 75% by weight being preferred.

The monovinylidene aromatic compounds which may be used to produce the interpolymer of the invention include styrene, alphamethylstyrene, alpha-chlorostyrene, parachloro-styrene, vinyl toluene, orthomethyl styrene, paramethyl-styrene, isopropyl styrene, di-chloro-styrene, etc. The preferred monovinylidene aromatic compounds are styrene or mixtures of styrene and α-methylstyrene. The use of α-methylstyrene leads to the production of an interpolymer having a heat distortion temperature higher than if styrene had been used. The proportion of monovinylidene aromatic compound in the interpolymer is in the range from about 12.5 to 20 weight %, preferably from 15 to 20 weight %.

The α-olefins which may be used in the production of the interpolymer include isobutylene, 2-methyl-butene-1, 2-methyl pentene-1, 2-methyl-hexene-1, 2-ethenyl-butene-1, 2-propyl-pentene-1, and the like. The preferred α-olefin is isobutylene. The proportion of α-olefin in the interpolymer is desirable between about 12.5 and 20 weight % and preferably between about 15 and about 20 weight %.

The amounts of the monovinylidene aromatic compound and of the α-olefin in the interpolymer are within the weight ratio of 1.3:1 to 1:1.3, preferably 1.1:1 to 1:1.1. This weight ratio has been found necessary in order to obtain the interpolymer having the desirable properties herein described.

It has been found that the interpolymers of the invention may be produced using an aqueous emulsion process in which increments of the unsaturated nitrile and monovinylidene aromatic compound are added to the polymerization system during the course of the polymerization reaction. The polymerization is carried out in an aqueous medium in the presence of at least one emulsifier and a free radical generating polymerization initiator at a temperature of about 20° – 80° C in the substantial absence of molecular oxygen. Conventional emulsifying agents can be used to form an emulsion of the monomers in water, such as fatty acid soaps, alkali metal or ammonium salts of high molecular weight alkyl or alkaryl sulphonates and sulphates, etc. In order to produce products which are clear and therefore desirable in most packaging applications, it is desirable to select emulsifiers which will produce a stable latex and yet be capable of being at least partially washed out of the latex prior to the recovery of the final resin. The polymerization reaction may be initiated by a catalytic initiator such as peroxy-type catalysts which may be used with a reducing agent to form a redox system. Examples of peroxy catalysts which may be used are alkali metal peroxides, alkali metal and ammonium persulphates, perborates, etc., and the other peroxides and hydroperoxides which are well known to those skilled in the art. The catalyst is generally present in an amount within the range from 0.01 to 2.0% by weight, and preferably in the order of 0.05 to 1.0% by weight of the polymerizable monomers. The actual amount depends on the particular monomers, the polymerization procedure and the desired reaction time. In an optional aspect of the process for practising the present invention, only a portion of the total catalyst may be added at the start of the polymerization reaction, followed by one or more increments of the residual catalyst during the course of the polymerization. For example, it is optional that up to 75% of the catalyst may be present at the start of the polymerization reaction, with the balance being added in one or more increments during the rest of the polymerization.

The reducing agents which may be used in the redox systems include alkali metal and ammonium sulphites and bisulphites, hydro-sulphites, formaldehyde-sulphoxylates as well as various other reducing agents for redox systems which are known to those skilled in the art. The amount of reducing agent will be about 0.01 to 1.0 weight % and preferably from about 0.05 to 0.5 weight % based on the polymerizable monomers, depending on the type of catalyst and the amount present.

The molecular weight of the interpolymer may be varied by the use of conventional molecular weight regulators such as higher alkyl mercaptans, for example, tertiary dodecyl mercaptan. The molecular weight of the product may be varied as desired over a wide range, but for the production of the articles with which this invention is concerned it is preferred to produce interpolymers having number average molecular weights in the range of from about 20,000 to about 100,000, preferably from about 50,000 to about 75,000.

In the practice of the invention it is desirable to carry the polymerization to as high a conversion as possible. It has been found that in the present process in which unsaturated nitrile and aromatic compound monomers are added incrementally, it is possible to achieve substantially complete conversion within a relatively short period of time. However, since polymerization of the last few percent of monomers tends to be slow, it is preferable to terminate the reaction short of complete conversion of monomers, for example, at from about 85 to about 95% conversion. The reaction time may vary widely depending upon the particular reactants and temperature used, but is generally from about 5 to about 10 hours.

When the desired conversion has been reached, a shortstop may be added to prevent further reaction, after which an antioxidant is added and the polymer coagulated and recovered, the recovered polymer crumb being washed and dried in a conventional manner such as in a hot air drier or by extrusion at an elevated temperature in a vented extruder. The polymer may be further processed to yield the product in a more desirable form, such as pellets, by conventional means.

In the polymerization process, increments of the unsaturated nitrile and the aromatic compound are added to the polymerization reaction during the course of the polymerization. This may be done in several increments during the course of the polymerization reaction or continuously over a period of several hours. The rate of addition is preferably such that not more than about 20 to 25% of the total amount of these two monomers to be added has been added to the polymerization reaction before about one-tenth of the alpha olefin has polymerized. The nitrile and aromatic compounds are added at a ratio essentially corresponding to that desired in the final polymer and within the range of 8:1 to 3:1, preferably 5:1 to 3:1 on a weight basis. The total amount of nitrile and aromatic compound is to be added before about 70 to about 80% conversion has been achieved but not before 60% conversion has been achieved. It is preferable to add the nitrile and aromatic compounds simultaneously to avoid the problem of production of homopolymers. The presence of homopolymers or homopolymer blocks is to be avoided to produce satisfactory products. For example, long sequences of acrylonitrile units result in interpolymers with poor colour and poor processing characteristics. The alpha olefin may also be added incrementally without adversely affecting the properties of the product, but in the case of the preferred alpha olefin, namely isobutylene, it is preferable to add all of the alpha olefin initially.

The interpolymers of this invention possess good barrier properties and flexural and tensile strength properties but, without some degree of orientation, do not show high impact strength. When these interpolymers are used in combination with other materials, such as for example, in laminates or in co-extrudates, it may not be necessary to orient the polymer so as to obtain, for the interpolymer, high impact strength, because such strength may be provided by the combination as a whole. When the interpolymers of this invention are used alone, it is frequently necessary to orient the interpolymer in order to obtain the necessary level of impact strength, the need for orientation being determined by the end use for the interpolymer. End uses of the interpolymer include, but are not limited to, packaging and containing a wide variety of materials. Films or sheets are extensively used for packaging foodstuffs and medicines; bottles and like-containers are extensively used to contain foodstuffs, medicines and liquids including alcoholic beverages and soft drinks. Such packaging and containing uses usually require of the material used therefor that it have certain strength characteristics in order to protect the whole from breakage due to dropping and to protect the whole from tear or other rupture during handling, etc. The interpolymers of this invention usually have notched Izod impact strengths below about 0.4 foot pounds prior to orientation while possessing tensile strengths of at least 7,500 psi and up to 10,000 psi and flexural strengths in excess of 10,000 psi, frequently as high as 14,000 psi. Following orientation of the interpolymer, the impact strength is increased by several times its original value.

Orientation of the interpolymer may be achieved by any of the methods well known in the art. The orientation process may be incorporated into the forming process or may be separate from and either before or after the forming process. Orientation may be uniaxial or biaxial and may be partial or essentially complete in degree. The degree of orientation achieved in the interpolymer will depend upon a combination of the forming process and the strength needs of the final use.

Films or sheets of the interpolymer may be prepared by extrusion, calendering, casting and other means well known to those skilled in the art. Typical temperatures for such molding processes may be between about 180° C and about 250° C. Such films or sheets may be solid members or they may be foamed members in which the foam is a closed cell in order to maintain low permeability. They may be in the form of thin films or various thickness sheets or panels, rods of various dimensions or actual containers of various shapes in rough or finished form. The interpolymer is usually recovered from the polymerization process in crumb form, and may be then formed into pellets, which may then be used to produce films, sheets, rods, etc. Films and sheets will normally be produced by extrusion processes and the film may be oriented to the desired extent following its formation. Bottles and containers are usually produced by blow molding, injection molding, vacuum molding, etc., and such processes are readily adaptable to cause some degree of orientation of the product of the process during the formation of a product. The primary effect due to orientation of the interpolymer is to markedly improve the impact and other strength properties without detracting from the impermeability properties of the interpolymer. Clearly in order to be useful, the interpolymers must possess sufficient thermoplastic characteristics to be processable by these means, i.e. the flow properties for use in these processes. The flow properties of the interpolymers of this invention improve as the temperature is increased. With the heat distortion temperature being in the range of 60° to 80° C, this allows the material to be readily processed, and to be further processed such as in the heat sealing of films or the welding together of components at relatively low temperatures. The interpolymer of this invention exhibits good stability at elevated temperatures and is thereby well suited for use in the above various processing means.

The films and sheets which may be produced using the interpolymers of the present invention may be used for packaging various types of foods and medicines where it is necessary to protect them from contact with moisture or from contact with gases such as oxygen. For example, dairy foods, meats and many medicines are sensitive to the presence of oxygen and moisture but may be stored for long periods when packaged using the interpolymers of this invention. Films of the interpolymers may be used alone or they may be used to impact impermeability to gases and water vapour in laminates with other materials such as other thermoplastic polymers or non-polymeric materials such as paper board, cellophane, etc. The interpolymer film may be on either side of such other materials or may be between such materials in a sandwich-type structure. In such applications the interpolymer may not need to be oriented, depending upon the particular end use for the laminate.

As indicated above, the interpolymers of this invention may be used for the production of bottles and are particularly useful for bottles containing liquids and gases under pressure. For example, due to the impermeability of the interpolymer to carbon dioxide, such bottles are particularly useful when equipped with a cap forming a gas-tight seal, for carbonated beverages where the gas pressure may be as high as 60 to 80 psi. Such bottles may be used satisfactorily to store the carbonated beverages for several weeks or months, without excessive loss of carbon dioxide.

The interpolymers of this invention possess a high resistance to attack by chemicals. There is essentially no gain in weight when the interpolymer is immersed for long periods of time in many aliphatic, cyclic and aromatic hydrocarbons, alcohols, organic acids and aqueous reagents. There is little swell of the interpolymer when it is maintained in contact with oils. However, the interpolymers are soluble in many ketones. In combination with the strength properties, this resistance to chemical attack makes the interpolymers very desirable for many packaging uses.

It is to be understood that in accordance with this invention, the interpolymers may be used with conventional additives in producing the packaging materials of the invention, such additives including but not being limited to, fillers, pigments, plasticizers, stabilizers, colouring agents, etc.

The following examples are given to illustrate the invention and are not to be construed as limiting the invention or the claims thereof. All parts and percentages are by weight unless otherwise indicated.

EXAMPLE 1

To a stainless steel polymerization reactor, equipped with temperature control means and agitation means, was added 200 parts of distilled water, 2 parts of the disodium salt of the straight chain exthoxylated alcohol half ester of sulphosuccinic acid (Aerosol A-102, sold by American Cyanamid Co.), 2 parts of sodium monoalkylphenoxy benzene disulphonate (Dowfax 2Al, sold by Dow Chemical Co.) and 0.2 parts of sodium bisulphite. The temperature of the reactor contents was adjusted to 73° F and 12 parts of acrylonitrile, 4 parts of styrene, 15 parts of isobutylene, 0.1 part of tertiary dodecyl mercaptan (Sulfole 120, sold by Phillips Petroleum Co.) and 0.5 parts of potassium persulphate were added thereto. The reactor contents were agitated and the temperature adjusted to 122° F. A mixture was prepared of 58 parts of acrylonitrile, 11 parts of sytrene and 0.4 parts of tertiary dodecyl mercaptan and the mixture was added to the reactor in four equal increments at one-hour intervals after the addition of the potassium persulphate. At four hours, an increment of 0.25 parts of potassium persulphate was added. After a total time of five and a half hours, an aqueous emulsion of an antioxidant (alkylated aryl phosphite) was added in sufficient amount to yield approximately one part of antioxidant per 100 parts of polymer and the latex was added to a one percent solution of calcium chloride at a temperature of about 190° F, the coagulated polymer being recovered as a crumb, washed with water and dried in a forced air drier at a temperature of 180° – 190° F. Analysis for acrylonitrile by the Micro Dumas method and for styrene and isobutylene by intra-red showed the polymer to contain 67.7 percent acrylonitrile, 16.5 percent isobutylene and 15.5 percent styrene.

EXAMPLE 2

The polymer crumb of Example 1 was milled at 352° F for 6 minutes to remove residual traces of water and the milled sheet was then chopped into pellets. Uniform thickness sheets of the polymer were prepared by compression molding the pellets, the permeability properties being determined for these sheets. The gas permeability was measured for carbon dioxide and for oxygen according to ASTM procedure D1434-66. Water vapour transmission was measured according to ASTM procedure E96-63T. The carbon dioxide permeability was found to be 3.0cc/100 sq. in. 24 hours . atmos. . mil. at 73° F and the oxygen permeability, under the same conditions, was found to be 1.6. The water vapour transmission was 0.6g/100 sq. in. 24 hours . mil. at 100° F and 95 percent relative humidity.

A portion of the pelletized polymer was compression molded at 180° C into bars of dimensions ¼ inch by ½ inch by 5 inches. Using these bars, the heat distortion temperature (ASTM D648) was found to be 70° C, the flexural strength (ASTM D790) was 13,400 psi and the flexural modulus was found to be 484,000 psi. The tensile strength, measured on conventional dumbbells, (ASTM D638) was 9,600 psi.

A further sample of the polymer was oriented in one direction by passing it between heated rollers rotating at different speeds. On flexing a portion of the oriented sheet through an angle of 180° in a direction parallel to the orientation, the sheet broke after two flexings whereas another portion flexed through an angle of 180° at right angles to the direction of orientation did not break until it had been flexed at least 14 times.

EXAMPLE 3

Polymer prepared as described in Example 1 was pelletized in an extruder and the pellets fed to a blow molding apparatus whereby 10 oz. bottles suitable for soft drink use, were formed. The bottles were filled with an aqueous fluid under a gas pressure of about 30 psi and capped. The bottles were dropped onto a solid surface until rupture occurred, the average drop height for rupture being about 6.5 feet. A similar glass bottle would rupture from a drop height of less than one foot.

EXAMPLE 4

A polymer was produced using the procedure of Example 1 except that the quantities of monomers used were 75 parts of acrylonitrile and 12.5 parts of each of styrene and isobutylene. The polymerization was stopped after seven hours, at which time conversion was 93% and the polymer was stabilized and recovered as in Example 1. Analysis of the polymer showed it to contain 71 percent of acrylonitrile, 15 percent of isobutylene and 14 percent of styrene.

Testing of the polymer as in Example 2 showed that the oxygen permeability and the carbon dioxide permeability were 2.1 and 4.9 respectively and the water vapour transmission was 0.8. A quantity of the polymer was molded into test bars and the physical properties were determined and found to be excellent.

EXAMPLE 5

Following the procedure of Example 1, a polymer was prepared using 60 parts of acrylonitrile, 20 parts of isobutylene, 15 parts of styrene and 5 parts of alphamethylstyrene. The polymer was found to contain 62% of acrylonitrile, 18% of isobutylene and 20% of styrene plus alphamethylstyrene. The heat distortion temperature was found to have increased, due to the presence of the alphamethylstyrene, to 75° C. The flexural strength was 15,300 psi and the flexural modulus 470,000 psi.

EXAMPLE 6

A polymer was prepared using the procedure of Example 1, the monomers used being 50 parts of acrylonitrile, 20 parts of methacrylonitrile, 15 parts of styrene and 15 parts of isobutylene. The recovered polymer had a heat distortion temperature of 76° C and a tensile strength of 11,000 psi.

EXAMPLE 7

To a stainless steel reactor at 75° F, equipped with inlet means, agitation means and temperature regulating means, was added 200 parts of water, 2 parts of Dowfax-2Al, 2 parts of Aerosol-A102, 0.2 parts of sodium bisulphite and 15 parts of isobutylene. 70 parts of acrylonitrile, 15 parts of styrene and 0.5 parts of Sulfole 120 were mixed in a separate vessel. Agitation of the contents of the reactor was started and the temperature of the contents raised to 122° F. The acrylonitrile, styrene, Sulfole mixture was continuously added to the reactor over a period of five hours at such a rate that 14 parts of acrylonitrile, 3 parts of styrene and 0.1 parts of Sulfole were added every hour. At four hours, an increment of 0.25 parts of potassium persulphate was added. The addition of the acrylonitrile, styrene, Sulfole mixture was completed at 79% conversion. The polymerization was stopped after 7 hours at 92% conversion, antioxidant was added to the latex and the polymer recovered by a similar method to that described in Example 1. Test pieces of the polymer were found to have a heat distortion temperature of 72° C, a tensile strength of 10,500 psi and a flexural strength of 15,900 psi. The polymer was found to contain 69% of acrylonitrile.

EXAMPLE 8

A polymer as prepared by the procedure of Example 7 and which contained 69 weight percent acrylonitrile, 15.5 weight percent styrene and 15.5 weight percent isobutylene was used to prepare films. A one inch diameter plastics extruder was used which had a screw having an L/D ratio of 25:1, the barrel set at a temperature of 360°–380° F and the die maintained at 450° F, the die being one of a slot die or an annular die.

Using the slot die, the ribbon produced was drawn down over rollers from a 20 mil. thickness to yield a film of about 1.4 mil. thickness. Using the annular die in combination with an internal expansion disc, a film of about 1 mil. thickness was obtained which was oriented in one direction. The properties of the films so produced are:

|  | Slot Die Film | Annular Die Film |
|---|---|---|
| Tensile strength psi | 13,800 | 16,100 |
| Elongation % | 23 | 42 |
| Tear Strength 16/in. | 1,390 | 2,030 |

EXAMPLE 9

A polymer containing 68.5 weight percent acrylonitrile, 16 weight percent styrene and 15.5 weight percent isobutylene was used to prepare narrow necked bottles by injection blow molding. The equipment used was a 2.5 inch diameter plastics extruder, with a screw having an L/D ratio of 24:1, attached to a single cavity, four station injectin blow molding machine. The extruder barrel was set at 380° F, the nozzle at 390°–400° F and the cycle time, a total of 15.5 seconds, included an injection time of 3 seconds and a blowing time of 7.5 seconds. The bottles so produced weighed 33 grams, had a capacity of 250 mls and a height of 21 cms. The bottles had good clarity, high surface gloss and were found to be of exceptional strength. The same polymer was used to produce wide-mouth jars by a ram injection blow molding process and these jars were found to be of good strength properties. All the bottles and jars were found to have impermeability characteristics similar to those shown in Example 2 and were found to be unaffected by a wide range of chemicals.

EXAMPLE 10

The polymers of this invention may be used as an impermeable component of multilayered sheets or containers, in the form of laminates. Other components for such laminates may include other thermoplastic polymers or non-polymeric materials such as paper, metal foils, glass, etc. Such laminates may be formed by extrusion coating or extrusion lamination, adhesion lamination and by co-extrusion techniques. A laminate of a film of the polymer of Example 7 in combination with one or more films of polystyrene may be used for food packaging, the film of the polymer of Example 7 acting as a vapor and moisture barrier for the laminate.

EXAMPLE 11

A polymer was prepared following the procedure of Example 7 and contained 67 weight percent of acrylonitrile, 17 weight percent of styrene and 16 weight percent of isobutylene; it was used for the preparation of biaxially oriented film. The polymer was fed to a 1-inch extruder which had a screw with an L/D ratio of 25/1 and which was equipped with a 1-inch diameter crosshead-type die having attached thereto a venturi-type air ring quench. Blow-up ratios of up to 3.5:1 were used to produce the film.

| Experiment No. | A | | B | |
|---|---|---|---|---|
| Extruder temperatures (° F) | | | | |
| Barrel 1 | 360 | | 350 | |
| Barrel 2 | 330 | | 290 | |
| Barrel 3 | 330 | | 290 | |
| Die | 445 | | 460 | |
| Take-off speed (ft/min) | 15 | | 20 | |
| Film thickness (inch) | 0.001 | | 0.0004 | |
| Film properties | (I) | (II) | (I) | (II) |
| Tensile strength (psi) | 2300 | 530 | 7300 | 3300 |
| Elongation (%) | 25 | 9 | 16 | 14 |
| Tear strength (lbs/in) | 1160 | 1030 | 1310 | 1100 |

Note
I - machine direction
II - perpendicular to machine direction.

The tensile strength and elongation were tested using ASTM procedure D-882-67 and the tear strength was measured according to ASTM procedure D-1004-69.

The film properties show that a reasonable degree of biaxial orientation was achieved, although the strength of the film perpendicular to the machine direction was somewhat low. The film was of high clarity and had a good surface gloss.

What we claim is:
1. Molded or extruded articles comprising oriented film formed by extruding an interpolymer at a temperature between 180° C and 250° C, said film being bonded to one or more sheets of one of polystyrene or paper, metal foil or glass, said interpolymer consisting essentially of (1) 60 to 75 weight percent of acrylonitrile, (2) 12.5 to 20 weight percent of styrene and (3) 12.5 to 20 weight percent is isobutylene, the amounts of (2) and (3) being within the weight ratio If 1.3:1 to 1:1.3, said interpolymer being substantially free of homopolymer and having a permeability to carbon dioxide of less than 7cc/100 sq. inch. 24 hours . atmos. mil at 73° F, permeability to oxygen of less than 3cc/100 sq. inch . 24 hours . atmos . mil at 73° F and water vapor transmission of less than 4g/100 sq. inch. 24 hours . mil at 95 percent relative humidity.
2. The oriented film of claim 1 bonded to two sheets of polystyrene in a sandwich structure.
3. The oriented film of claim 1 bonded to two sheets of paper board in a sandwich structure.

* * * * *